B. P. ROMAIN.
FREQUENCY METER.
APPLICATION FILED JULY 5, 1917.

1,277,757.

Patented Sept. 3, 1918.

Inventor
Burchard P. Romain

UNITED STATES PATENT OFFICE.

BURCHARD P. ROMAIN, OF SOUTH ORANGE, NEW JERSEY, ASSIGNOR TO WESTON ELECTRICAL INSTRUMENT COMPANY, OF NEWARK, NEW JERSEY, A CORPORATION OF NEW JERSEY.

FREQUENCY-METER.

1,277,757.  Specification of Letters Patent.  Patented Sept. 3, 1918.

Application filed July 5, 1917. Serial No. 178,853.

*To all whom it may concern:*

Be it known that I, BURCHARD PRESCOTT ROMAIN, a citizen of the United States, residing at South Orange, in the county of Essex and State of New Jersey, have invented certain new and useful Improvements in Frequency-Meters, of which the following is a specification.

The present invention relates to instruments for measuring the frequency of alternating currents, commonly called frequency meters.

It is the special object of my invention to design a meter that is highly susceptible and responsive to minute changes of frequency and gives large scale deflections for comparatively small changes.

Another object of my invention is to produce a frequency meter so mechanically executed that the ratio between the change of frequency and the deflection of the pointer may be varied to meet various requirements without radical changes in the instrument design, considered from a manufacturing standpoint.

With the above stated objects in view, it was also my general object to produce a meter that possesses the advantage of simplicity of construction.

For a fuller understanding of my invention reference is had to the appended drawing in which—

Figure 1:
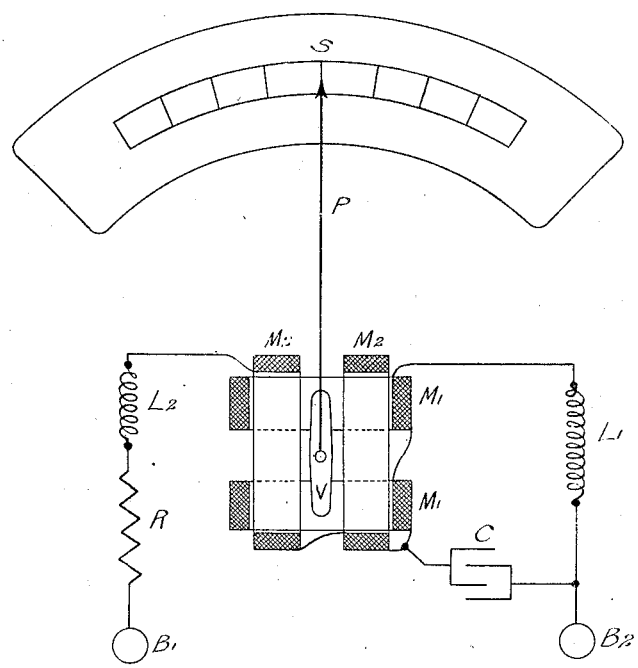
Figure 2:
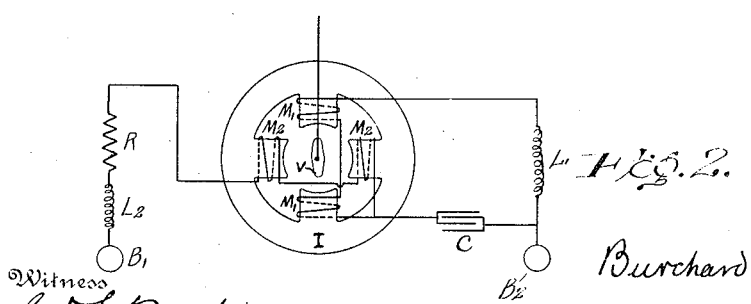

Figure 1 is a diagrammatic representation of the elements of construction and of the principles on which the construction is based; and Fig. 2 is a similar construction embodying a modified form of magnet.

$M_1$ $M_1$ and $M_2$ $M_2$ are coils of wire having their axes at right angles to each other. $B_1$ and $B_2$ are binding posts for connection with a source of current, the frequency of which is to be tested. The coils are connected in series. Between one of the binding posts, $B_2$ in this drawing, and the outer end of coils $M_1$ $M_1$ is inserted an inductive reactance $L_1$. Between the same binding post and the connection between the coils $M_1$ $M_1$ and $M_2$ $M_2$ is inserted a condenser C. The other end of coils $M_2$ $M_2$ is connected to the other binding post $B_1$.

In the magnetic field produced by the two sets of coils is placed an iron vane V carrying a pointer P adapted to swing over a scale S.

The current passing through the inductive reactance $L_1$ and the coils $M_1$ $M_1$ tends to hold the iron vane V in the position shown in the drawing *i. e.* in the axis of the coils.

The current passing through the coils $M_2$ $M_2$ tends to turn the iron vane into axes of these coils or at right angles to the position shown in the drawing.

As the current through $L_1$ is nearly in phase opposition to that flowing through the condenser C and these currents combine before passing through the coils $M_2$ $M_2$, practically no field will be produced by the coils $M_2$ $M_2$ when the currents flowing through $L_1$ and C are equal and the needle will not be deflected from the position shown in the drawing. This condition is, in fact, the normal condition of the instrument attained when the frequency has the normal value for which the meter is designed. The values of inductance for $L_1$ and of the capacity for C are so chosen that for the normal or mean frequency for which the meter is designed the combined currents through $L_1$ and C will produce substantially no deflecting effect on the vane V.

Then, since the inductive reactance and capacity reactance are differently affected by variations of frequency, the ratio of the currents in the two branches will vary with variations of the frequency and the current in one branch will preponderate over that through the other branch according to whether the frequency is above or below normal.

When the current through $L_1$ preponderates over that flowing through the condenser C the resultant current flowing through the coils $M_2$ $M_2$ will have an amplitude equal to the difference between the amplitude of the branch currents and the sign is that of the preponderating current. When the current flowing through the condenser preponderates the reverse will take place. The needle will swing to one side or the other of its normal portion depending on the particular conditions above referred to and thus measure the ratio of the resultant amplitudes of the currents in $M_1$ $M_1$ and $M_2$ $M_2$ which are a function of the values of the frequency and the instrument will therefore indicate frequency.

When the number of turns on coils $M_2$ $M_2$ is large as compared with the turns in $M_1$ $M_1$, a small change of frequency will be sufficient to produce a large deflection of the pointer because a small resultant current in it will cause a relatively powerful magnetic effect in one direction or the other according to whether the frequency is above or below normal. Hence it is seen that the character of the scale is easily altered to suit any desired condition by a simple change in design.

Between the outer end of coils $M_2$ $M_2$ and binding post $B_1$ I have inserted a resistor R to limit the current through the instrument where there are pronounced higher harmonics which would cause large currents to flow through the condenser C on account of the high frequency.

Between the outer ends of coils $M_2$ $M_2$ and binding posts B I have shown inserted an inductance $L_2$. The provision of this inductance is of special application where the wave form departs materially from a true sine wave such as in wireless telegraph generators under load, etc., and the specific function of this inductance is to decrease the wave form error existing under such conditions.

Fig. 2 differs from Fig. 1 only as to the particular means for producing magnetic fields at an angle to each other. In this form of device I represents a laminated core on which the coils $M_1$ $M_1$ and $M_2$ $M_2$ are wound.

While I have described a specific embodiment of my invention, there is considerable latitude in carrying out the object stated. By reversing the relative positions of the condenser C and the inductance $L_1$, the instrument is equally operative, although it is perhaps not as satisfactory as the construction described.

I claim:—

1. A frequency meter comprising two coils arranged to produce magnetic fields at an angle to each other, electrical devices arranged to produce two currents of substantially opposite phase, and having a relative magnitude dependent upon the frequency, electrical connections for passing one of said currents through one of the two field coils and the resultant, or vector sum of the two currents of substantially opposite phase, through the other field coil, a magnetic vane in the resultant magnetic field of said coils and an indicating device attached thereto.

2. A frequency meter comprising two coils arranged to produce magnetic fields at an angle to each other, one of said coils having a relatively large number of turns, electrical devices arranged to produce currents of substantially opposite phase and of a relative magnitude dependent upon the frequency, electrial connections for passing one of said currents through the field coil having the smaller number of turns and the resultant, or vector sum of the two currents of substantially opposite phase, through the other field coil, a magnetic vane in the resultant magnetic field of said coils and an indicating device attached thereto.

3. A frequency meter comprising two coils arranged to produce magnetic fields at an angle to each other, a condenser and inductance, electrical connections so arranged that the current through one of said elements passes through one of the two field coils and the resultant, or vector sum of the combined currents in said condenser and inductance, passes through the other field coil, a magnetic vane in the resultant magnetic field of said coils and an indicating device attached thereto.

4. A frequency meter comprising two coils arranged to produce magnetic fields at an angle to each other, one of said coils having a relatively large number of turns, a condenser and inductance, electrical connections so arranged that the current through one of said elements passes through the field coil having the smaller number of turns and the resultant, or vector sum of the combined currents in said condenser and inductance, passes through the other field coil, a magnetic vane in the resultant magnetic field of said coils and an indicating device attached thereto.

5. A frequency meter comprising two coils arranged to produce magnetic fields at an angle to each other, a condenser and inductance, electrical connections so arranged that the current through the inductance passes through one of the two field coils and the resultant, or vector sum of the combined currents in said condenser and inductance, passes through the other field coil, a magnetic vane in the resultant magnetic field of said coils and an indicating device attached thereto.

6. A frequency meter comprising two coils arranged to produce magnetic fields at an angle to each other, one of said coils having a relatively large number of turns, a condenser and inductance, electrical connections so arranged that the current through the inductance passes through the field coil having the smaller number of turns and the resultant, or vector sum of the combined currents in said condenser and inductance, passes through the other field coil, a magnetic vane in the resultant magnetic field of said coils and an indicating device attached thereto.

7. A frequency meter comprising two coils arranged to produce magnetic fields at an angle to each other, a condenser and inductance, electrical connections so arranged that the current through one of said elements passes through one of the two field coils and the resultant, or vector sum of the combined currents in said condenser and inductance, passes through the other field coil, a resistor connected between all of the above elements and the source of supply, a magnetic vane in the resultant magnetic field of said coils and an indicating device attached thereto.

8. A frequency meter comprising two coils arranged to produce magnetic fields at an angle to each other, a condenser and inductance, electrical connections so arranged that the current through one of said elements passes through one of the two field coils and the resultant, or vector sum of the combined currents in said condenser and inductance, passes through the other field coil, a resistor and an inductance connected in series between all of the above elements and the source of supply, a magnetic vane in the resultant magnetic field of said coils and an indicating device attached thereto.

9. A frequency meter comprising two coils arranged to produce magnetic fields at an angle to each other, a condenser and inductance, electrical connections so arranged that the current through the inductance passes through one of the two field coils and the resultant, or vector sum of the combined currents in said condenser and inductance, passes through the other field coil, a resistor connected between all of the above elements and the source of supply, a magnetic vane in the resultant magnetic field of said coils and an indicating device attached thereto.

10. A frequency meter comprising two coils arranged to produce magnetic fields at an angle to each other, a condenser and inductance, electrical connections so arranged that the current through the inductance passes through one of the two field coils and the resultant, or vector sum of the combined currents in said condenser and inductance, passes through the other field coil, a resistor and an inductance connected in series between all of the above elements and the source of supply, a magnetic vane in the resultant magnetic field of said coils, and an indicating device attached thereto.

11. A frequency meter comprising two coils arranged to produce magnetic fields at an angle to each other, one of said coils having a relatively large number of turns, a condenser and inductance, electrical connections so arranged that the current through the inductance passes through the field coil having the smaller number of turns and the resultant, or vector sum of the combined currents in said condenser and inductance, passes through the other field coil, a resistor and an inductance connected in series between all of the above elements and the source of supply, a magnetic vane in the resultant magnetic field of said coils and an indicating device attached thereto.

In testimony whereof I affix my signature in presence of two witnesses.

BURCHARD P. ROMAIN,

Witnesses:
A. R. BRIGGS,
W. W. BIRCH.